US012602315B2

(12) United States Patent
Zhang et al.

(10) Patent No.: US 12,602,315 B2
(45) Date of Patent: Apr. 14, 2026

(54) METHOD, DEVICE, AND PROGRAM PRODUCT FOR COLLECTING OR SHOOTING MEMORY BULLETS

(71) Applicant: Dell Products L.P., Round Rock, TX (US)

(72) Inventors: Ming Zhang, Beijing (CN); Chen Gong, Beijing (CN); Shuning Zhang, Beijing (CN); Huan Chen, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/928,358

(22) Filed: Oct. 28, 2024

(65) Prior Publication Data

US 2025/0335350 A1      Oct. 30, 2025

(30) Foreign Application Priority Data

Apr. 25, 2024    (CN) .......................... 202410511012.4

(51) Int. Cl.
*G06F 12/00*         (2006.01)
*G06F 12/02*         (2006.01)
(52) U.S. Cl.
CPC .................................. *G06F 12/023* (2013.01)

(58) Field of Classification Search
CPC ...... G06F 12/023; G06F 12/0806; G06F 9/46; G06F 9/50
See application file for complete search history.

(56) References Cited

U.S. PATENT DOCUMENTS

| | | | |
|---|---|---|---|
| 9,432,298 B1 | 8/2016 | Smith | |
| 11,822,473 B2 | 11/2023 | Shveidel et al. | |
| 2006/0101081 A1 | 5/2006 | Lin et al. | |
| 2008/0140937 A1 | 6/2008 | Nalawade et al. | |
| 2009/0037367 A1 | 2/2009 | Wein | |
| 2010/0293353 A1* | 11/2010 | Sonnier ................. | H04L 49/109 |
| | | | 711/170 |
| 2011/0138123 A1 | 6/2011 | Gurajada et al. | |
| 2018/0225224 A1* | 8/2018 | Senior ................. | G06F 12/0897 |
| 2022/0229777 A1 | 7/2022 | Shveidel et al. | |
| 2022/0342721 A1 | 10/2022 | Shveidel et al. | |
| 2023/0030703 A1 | 2/2023 | Shveidel et al. | |

* cited by examiner

*Primary Examiner* — Shawn X Gu
(74) *Attorney, Agent, or Firm* — BainwoodHuang

(57) ABSTRACT

Techniques collect or shoot memory bullets. Each magazine includes at least one address pointer for at least one memory bullet. Such techniques involve: obtaining memory bullets to be collected or shot; determining whether remaining address pointers in multiple magazines of a first core have a capacity to collect or shoot a memory bullet; and borrowing a magazine as needed from a second core in response to determining that the remaining address pointers in the first core have no capacity to collect or shoot a memory bullet. Such techniques can achieve a balance of magazines among multiple cores, thereby facilitating memory pool allocation.

20 Claims, 11 Drawing Sheets

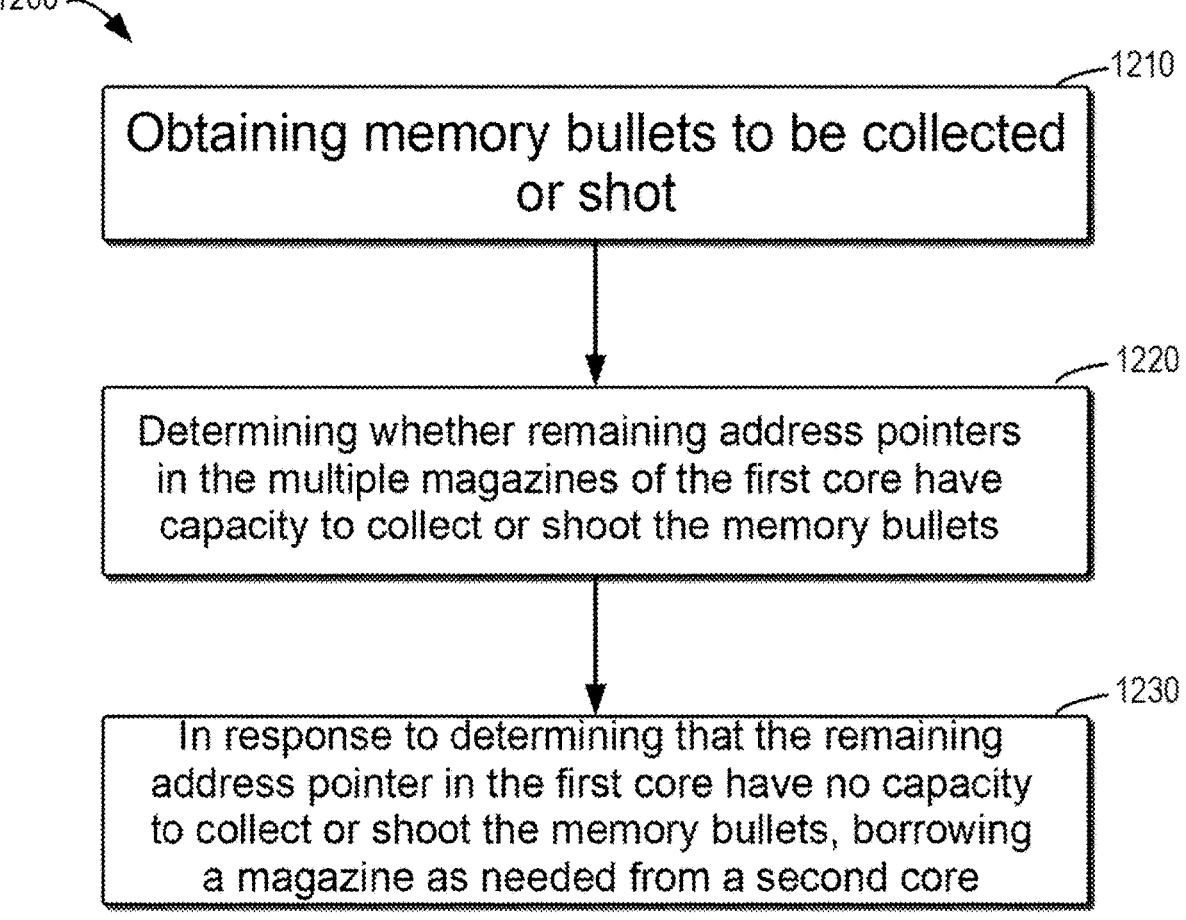

1200

1210
Obtaining memory bullets to be collected or shot

1220
Determining whether remaining address pointers in the multiple magazines of the first core have capacity to collect or shoot the memory bullets 1230
In response to determining that the remaining address pointer in the first core have no capacity to collect or shoot the memory bullets, borrowing a magazine as needed from a second core

FIG. 12

METHOD, DEVICE, AND PROGRAM PRODUCT FOR COLLECTING OR SHOOTING MEMORY BULLETS

CROSS-REFERENCE TO RELATED APPLICATION

This application claims priority to Chinese Patent Application No. CN202410511012.4, on file at the China National Intellectual Property Administration (CNIPA), having a filing date of Apr. 25, 2024, and having "METHOD, DEVICE AND PROGRAM PRODUCT FOR COLLECTING OR SHOOTING MEMORY BULLET" as a title, the contents and teachings of which are herein incorporated by reference in their entirety.

TECHNICAL FIELD

Embodiments of the present disclosure mainly relate to the field of data management, and more particularly, to a method, a device, and a computer program product for collecting or shooting memory bullets.

BACKGROUND

With the emergence of new hardware platforms, more and more central processing unit (CPU) cores are deployed. There are more requirements on the memory allocation of pools. In particular, there exists a heavy pressure in allocation for every core simultaneously. In related art, there exists a global pool from which a first core and a second core can request memory when they need it. When the first and second cores make request at the same time, there may be a conflict, and the global pool cannot handle the request in parallel, which means that there is a heavy pressure in allocation.

SUMMARY OF THE INVENTION

According to an example embodiment of the present disclosure, provided is a method for collecting or shooting memory bullets, including: obtaining memory bullets to be collected or shot, the memory bullets being to be collected to or shot out from a first core including multiple magazines, wherein each magazine includes at least one address pointer specific to at least one memory bullet; determining whether remaining address pointers in the multiple magazines of the first core have a capacity to collect or shoot a memory bullet; and borrowing a magazine as needed from a second core in response to determining that the remaining address pointers in the first core have no capacity to collect or shoot a memory bullet.

In a second aspect of the embodiments of the present disclosure, there is provided an electronic device. The electronic device includes at least one processor; a memory coupled to the at least one processor and having instructions stored thereon, the instructions, when executed by the at least one processor, causing the electronic device to perform actions including: obtaining memory bullets to be collected or shot, the memory bullets being to be collected to or shot out from a first core including multiple magazines, wherein each magazine includes at least one address pointer specific to at least one memory bullet; determining whether remaining address pointers in the multiple magazines of the first core have a capacity to collect or shoot a memory bullet; and borrowing a magazine as needed from a second core in response to determining that the remaining address pointers in the first core have no capacity to collect or shoot a memory bullet.

In a third aspect of the embodiments of the present disclosure, a computer program product is provided. The computer program product is tangibly stored on a non-volatile computer-readable medium and includes machine-executable instructions, wherein the machine-executable instructions, when executed, cause a machine to perform the method according to the first aspect of the present disclosure.

It should be understood that the contents described in the Summary of the Invention part is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIG. 12 illustrates a flowchart of a method for collecting or shooting memory bullets in a first core including multiple magazines according to some embodiments of the present disclosure.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

As mentioned above, in the related art, there exists a global pool from which a first core and a second core can request memory when they need it. When the first and second cores make request at the same time, there may be a conflict and the global pool cannot handle the request in parallel, which means that there is a heavy pressure allocation.

Figure 1A:
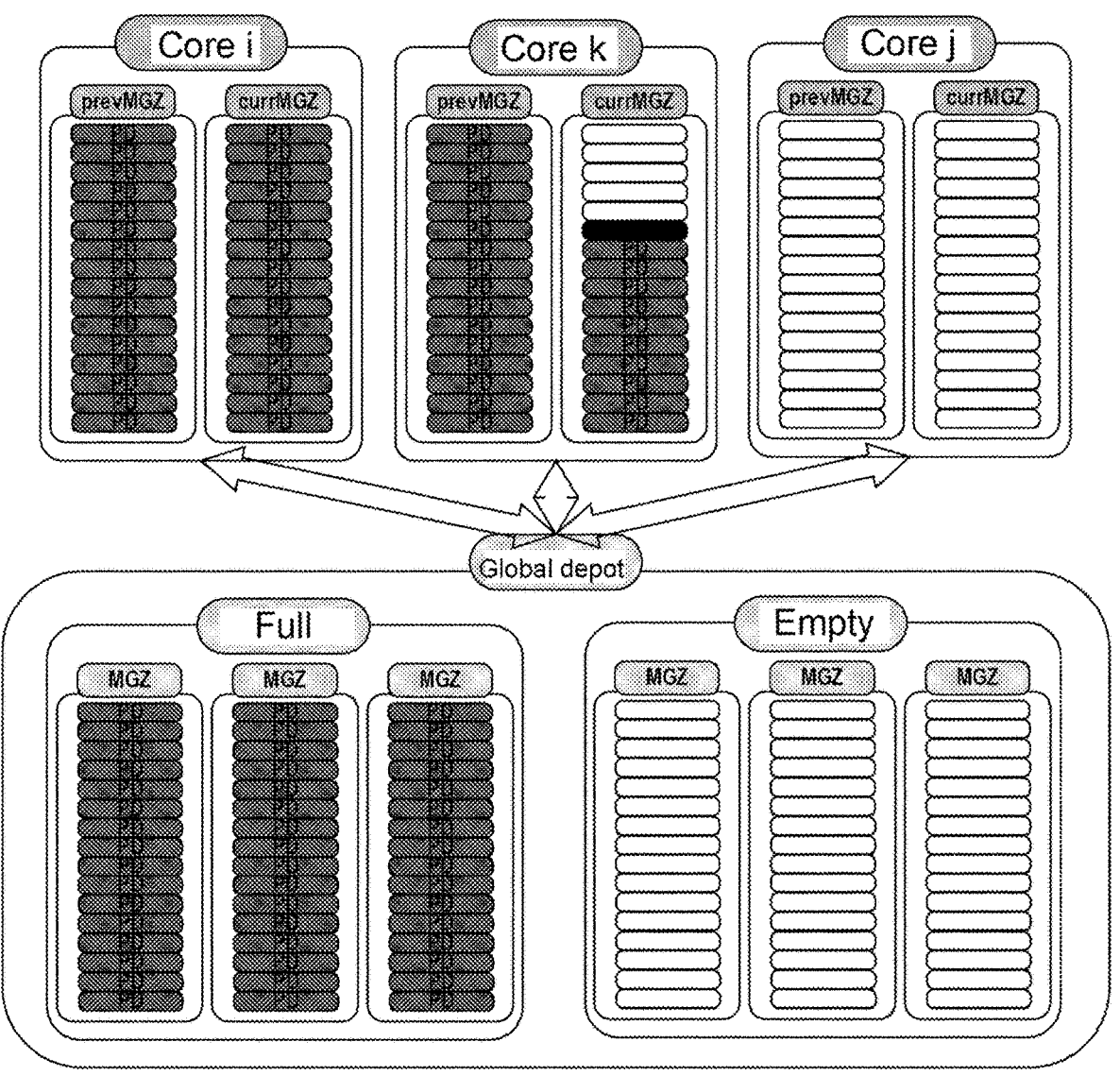
FIG. 1A illustrates a design layout of a data management system according to a related design.

FIG. 1A illustrates a layout diagram of a design according to a related method. In this design, each of multiple cores (e.g., a core i, a core j, and a core k) has two magazines (abbreviated as MGZ in the figure), namely, a previous magazine (prevMGZ) and a current magazine (currMGZ). There are multiple descriptors in each magazine (e.g., PDs shown in FIG. 1), and each descriptor has some metadata, which include, for example, address pointers. In this design, there also exists a global depot that stores all full and empty magazines as shown in FIG. 1.

As shown in FIG. 1A, the previous magazine of the core k is a full magazine, but the current magazine of the core k is a half-full magazine (the location not padded with the PDs is shown in light color and the location padded with the PDs is shown in dark color), so the core k can no longer collect data, but the half-full magazine can still collect data. If data needs to be taken out of the core k or the core k needs to collect data, the PD (e.g., the top PD (shown in black) in the current magazine) may be directly shot out of the current magazine, or the data is added to the location above that PD.

Figure 1B:
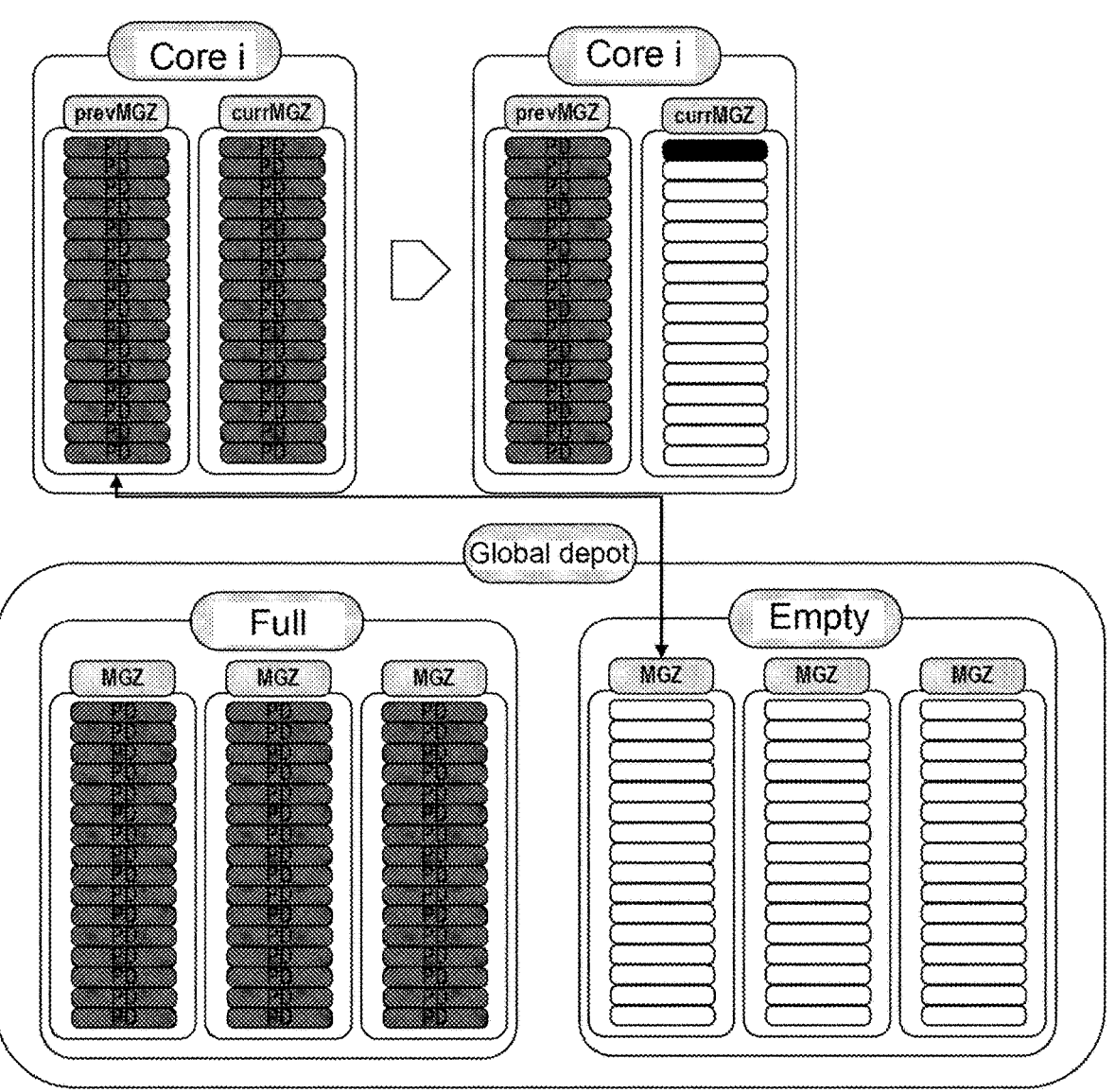
FIG. 1B illustrates a schematic diagram of a core i collecting data according to a related design.

FIG. 1B illustrates a schematic diagram of a core i collecting data according to a related design. As shown in FIG. 1B, the current magazine of the core i is full, so if data needs to be taken out from the core i, which is relatively simple, it is only necessary to allocate data (e.g., the topmost data in the current magazine) out of the current magazine. But if to fill the core i with data, it will be more challenging. No space exists in any magazine in the core i for filling in new data. The program needs to find an empty magazine from the global depot and replace the full previous magazine with an empty magazine from the global depot, then exchange the location of the current magazine and the location of the obtained empty magazine to make the current magazine to be empty, thus pushing or collecting the data to the location shown by the black block in the current magazine (the location contains an address pointer pointing to a memory bullet).

Figure 1C:
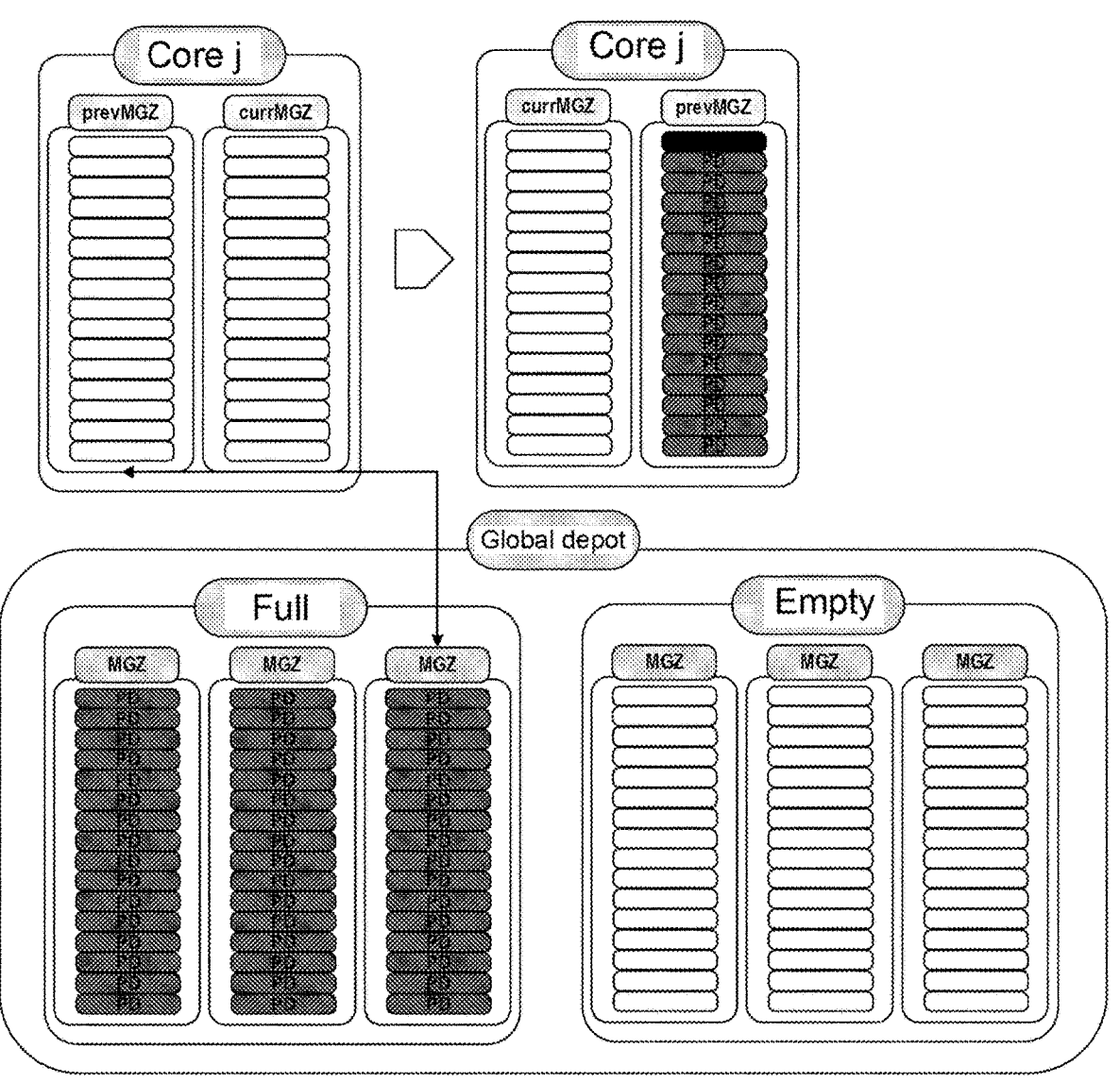
FIG. 1C illustrates a schematic diagram of taking data out of a core j according to a related design.

FIG. 1C illustrates a schematic diagram of taking data out of a core j according to a related design. As shown in FIG. 1C, both the current magazine and the previous magazine of the core j are empty. It is easy to add data to the core j by simply filling the data into one of the descriptors of the current magazine. However, it is challenging to take data out of the core j because the current magazine of the core j is empty and there is no data to be taken out. When data needs to be taken out of the core j, as shown in FIG. 1C, a full magazine is searched for from the global depot, the empty previous magazine of the core j is replaced with the full magazine searched out, then the location of the current magazine and the location of the previous magazine are exchanged, and finally the required data (e.g., data represented by the black block shown in FIG. 1C) is popped out of the current magazine.

The design shown in FIG. 1A to 1C is essentially a center-and-agent model. It works fine when the throughput is not very large because an agent does not need to exchange resources with the center very often. However, when there exists heavy load in each core, the global depot becomes a bottleneck. All cores will compete for the same resources, which may cause waste of a CPU and may lead to global lock socket and cache line ping-pong between cores.

In view of the above problem, embodiments of the present disclosure provide a method for collecting or shooting memory bullets. The method includes: obtaining memory bullets to be collected or shot, the memory bullets being to be collected to or shot out from a first core including multiple magazines, wherein each magazine includes at least one address pointer specific to at least one memory bullet; determining whether remaining address pointers in the multiple magazines of the first core have a capacity to collect or shoot a memory bullet; and borrowing a magazine as needed from a second core in response to determining that the remaining address pointers in the first core have no capacity to collect or shoot a memory bullet. The method according to the present disclosure is a purely distributional model without the inherent problem of centralization. As a result, a better balance among multiple cores can be achieved, and cross-core browsing among the cores can be significantly reduced, especially on a heavy load condition.

Figure 2:
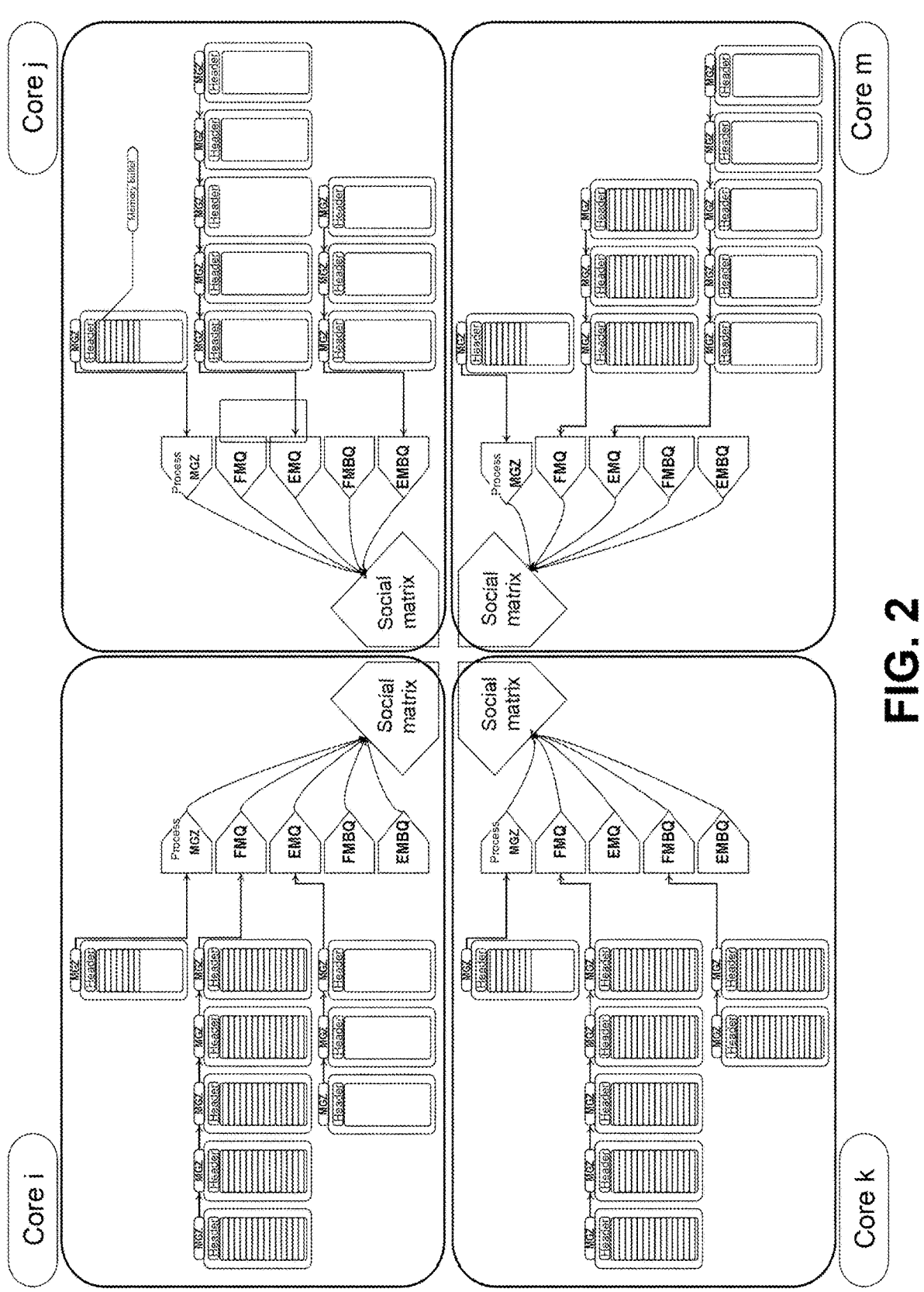
FIG. 2 illustrates a schematic design diagram for implementing a balance of magazines in multiple cores according to some embodiments of the present disclosure.

FIG. 2 illustrates a schematic design diagram of a system for implementing a balance of magazines in multiple cores according to some embodiments of the present disclosure.

As shown in FIG. 2, the data management system 200 includes multiple cores, such as cores i, j, k, and m. Each core includes multiple magazines. Each of the magazines is a large magazine that contains address pointers pointing to multiple memory bullets, where the memory bullets are basic memory allocation units. For example, each address is a descriptor that has some metadata, which includes, for example, an address pointer. As shown in FIG. 2, each core includes a process magazine (PMGZ), which is a magazine undergoing the process of shooting and collecting data memory bullets (i.e., shooting and collecting data), e.g., it may be a magazine.

In addition, as shown in FIG. 2, each core further includes a first-type magazine queue, such as a full magazine borrowed queue (FMBQ), which is a queue with multiple borrowed magazines that are currently full, and accordingly the FMBQ may include multiple magazines borrowed from other cores. As shown in FIG. 2, each core further includes a second-type magazine queue, such as a full magazine queue (FMQ) of its own, which is a queue with multiple full magazines owned by the core itself, and accordingly the FMQ may include multiple full magazines owned by the core itself.

It should be noted that a full magazine in the FMBQ, while currently full in the core, was empty when it was borrowed, and then is filled to full in that core. Subsequently, the core needs to allocate all of the filled data (i.e., meet the return condition) and return the empty magazine, so the magazine needs to be in whatever state when it was borrowed when it is returned. For example, a first core can borrow an empty magazine from a second core, the second core has no capacity to fill the empty magazine at this time, and accordingly the magazine is lent to the first core; the first core fills the magazine, then allocates all of the data in the magazine, and returns the empty magazine to the second core.

In addition, as shown in FIG. 2, each core further includes a first-type empty magazine queue, such as an empty magazine borrowed queue (EMBQ), which is a queue of multiple borrowed magazines that are currently empty, and accordingly the EMBQ may include multiple magazines borrowed from other cores. As shown in FIG. 2, each core further includes a second-type empty magazine queue, such as an empty magazine queue (EMQ) of its own, which is a queue of multiple empty magazines owned by the core itself, and accordingly the EMQ may include multiple empty magazines owned by the core itself.

It should be noted that an empty magazine in the EMBQ, while currently empty in the core, was full when it was borrowed and then data is all allocated out in that core. Subsequently, the core needs to refill the magazine with data (i.e., meet the return condition) and return the full magazine, so the magazine needs to be in whatever state when it was borrowed when it is returned. For example, the first core can borrow a full magazine from the second core, the second core has no capacity to allocate the data in the full magazine at this time, and accordingly the full magazine is lent to the first core; and the first core allocates all of the data in the magazine, then refills the magazine and returns the full magazine to the second core.

As shown in FIG. 2, each core further includes a social module that includes a social matrix. The social matrix stores information about multiple types of magazine queues for that core. The social matrix serves as a medium for exchanging information between magazines when cores borrow and return magazines from each other.

Each core initially has a batch of full and empty MGZs, five queues (e.g., PMGZ, FMQ, FMBQ, EMQ, and EMBQ), and a social module. In general, memory bullets will be shot or collected under budget of each core without interacting with another core. When a core runs out of resources, it will borrow an MGZ from a dedicated queue of another core according to an indication of the social matrix. Moreover, this core will exchange its own information with a related core through the social module, thereby improving the information accuracy. When some borrowed MGZs (regardless of what the current core borrows) reach the return condition, these MGZs will actively restore to the original state of an original core, so that the system can keep balanced.

A schematic diagram of a layout structure of each magazine according to some embodiments of the present disclosure will be described below with reference to FIG. 3.

Figure 3:
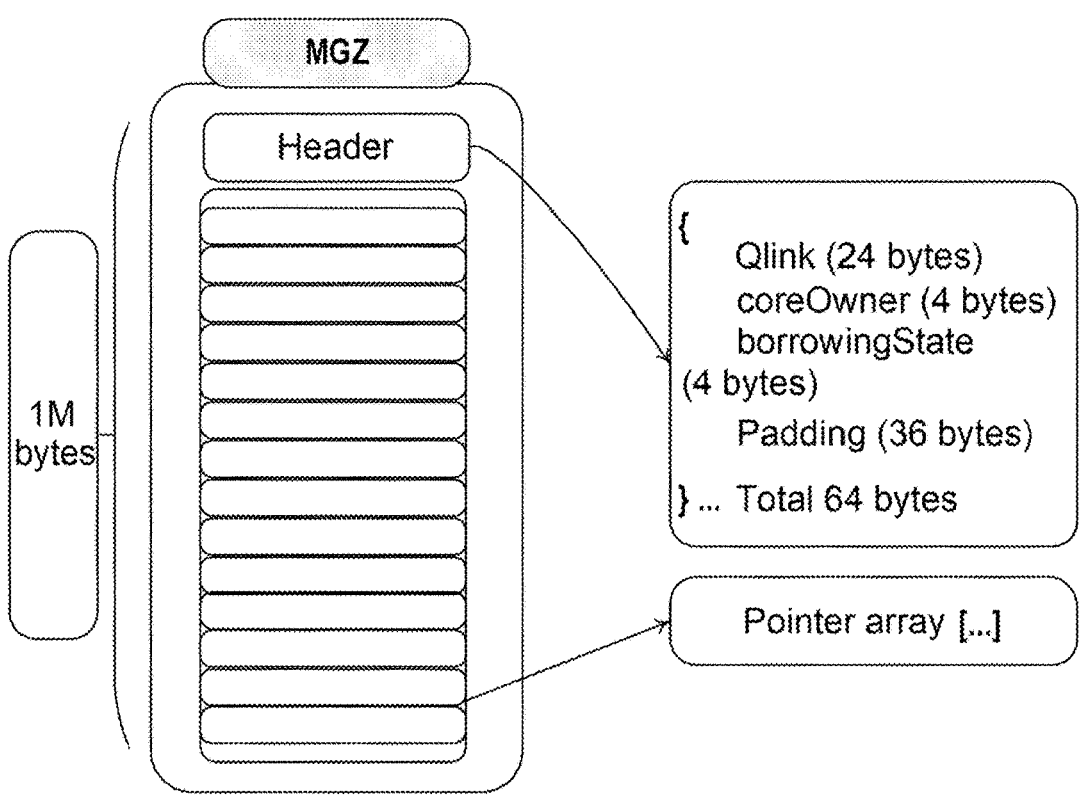
FIG. 3 illustrates a schematic diagram of a layout structure of each magazine according to some embodiments of the present disclosure.

As shown in FIG. 3, the size of each MGZ may be 1M bytes, which may have a header of 64 bytes and the remaining space is a pointer array. Each address pointer will point to a memory bullet in memory. For example, if each memory bullet is 64 bytes in size, the MGZ can hold nearly 8M bytes of memory. This provides greater memory utilization than existing designs.

The header according to an embodiment of the present disclosure includes: a queue link (Qlink) used to link the MGZ to a link in a dedicated queue, for example, it may be 24 bytes. The header according to an embodiment of the present disclosure further includes: information of a core to which it belongs (coreOwner), for example, it may be 4 bytes, where each MGZ should be constrained with one core as a budget, which is the basic core balancing rule. The MGZ may be borrowed from the core it belongs to, but it eventually needs to be returned so as to maintain a memory balance among cores.

The header according to an embodiment of the present disclosure further includes: information of a borrowing state (borrowingState), where NONE is a default state, meaning that this MGZ is in service within the core to which it belongs; B_FULL means that this MGZ was full when lent to another core and should be full when returned; and B_EMPTY means that this MGZ was empty when lent to another core and should be empty when returned. Finally, the header according to an embodiment of the present disclosure further includes information of padding, which may be 36 bytes, for example.

Figure 4:
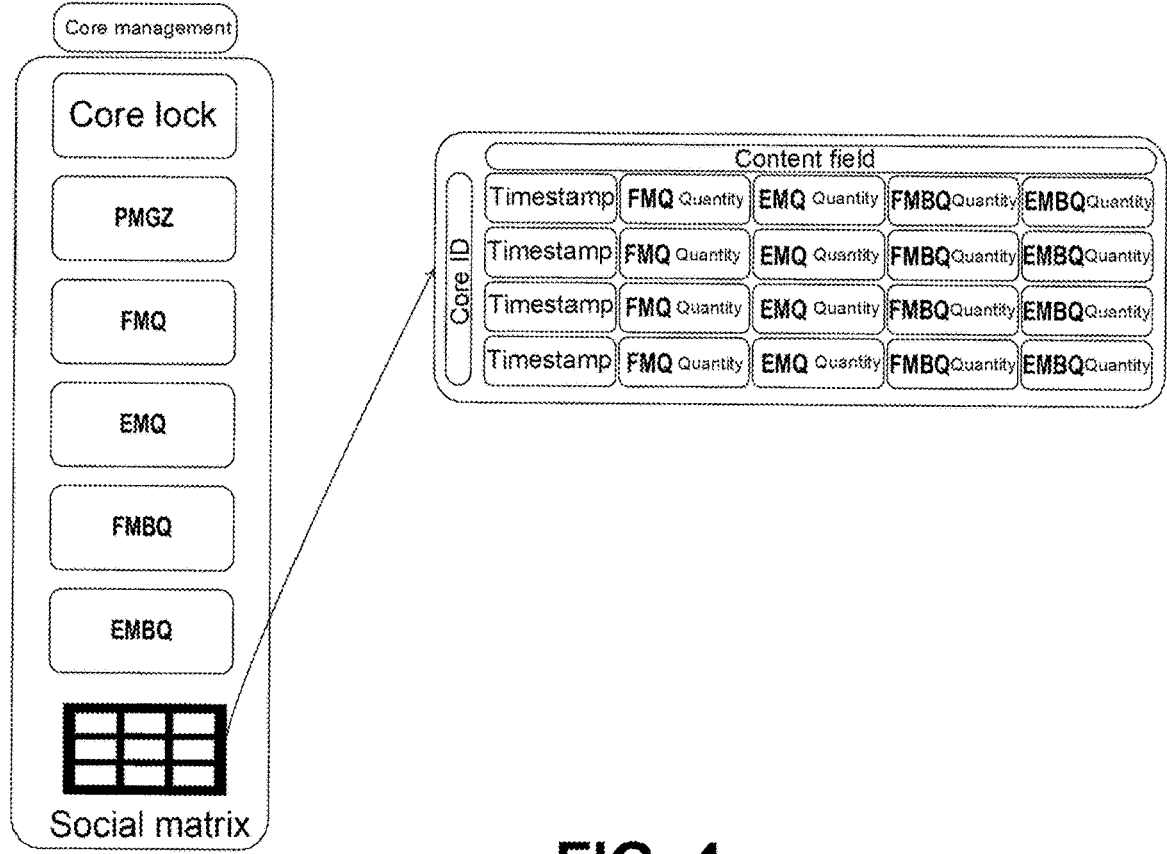
FIG. 4 illustrates a schematic diagram of a core management structure according to some embodiments of the present disclosure.

FIG. 4 illustrates a schematic diagram of a core management structure according to some embodiments of the present disclosure. As shown in FIG. 4, each core has a core management structure for managing the MGZs. The core management structure includes: a core lock (coreMgLock), where each core spins the lock to protect the core management contents; social matrix (Social Metrix), which is a matrix that stores management information of each core (other than its own information, which may be inaccurate but will become accurate after multiple times of communications). Each core includes one row, containing fields of: timestamp (TIME STAMP), which is stamped by a CPU when this row is filled; and various sizes of queues, which indicate the numbers of MGZs in the respective queues (e.g., FMQ, EMQ, FMBQ, and EMBQ).

By default, each core further has one empty MGZ to prevent the system from being blocked. For example, one core performs data collection, and all other cores perform data allocation. The core for data collection needs enough empty MGZs to buffer the memory bullets until some of the cores for data allocation have empty MGZs. Therefore, each core has one empty MGZ (a full-empty MGZ serial number is equal to a process MGZ serial number), ensuring that all process MGZs are used up.

The following will describe in detail a balancing approach used to achieve the magazine balance. This means that all individuals utilize the available resources they have to keep the system balanced to the utmost extent. This balancing approach follows a rule which includes that all cores have an equal number of full and empty magazines by default. The rule further includes: a core works alone within its budget; and when the budget is exceeded, the core will borrow a magazine as needed from another core according to an indication of the social matrix. When borrowing a magazine from another core, the first core needs to follow a certain priority. For example, when it needs to borrow a full magazine from another core, the first priority is a full magazine in an FMBQ of other cores, and the second priority is a full magazine in an FMQ of other cores. When borrowing an empty magazine from another core, the first core needs to follow a certain priority. For example, the first priority is an empty magazine in an EMBQ of other cores, and the second priority is an empty magazine in an EMQ of other cores. In addition, the rule further includes: when the magazine is full/empty (i.e., when the return condition is met), the core will actively return the magazine based on a tag inside the magazine; and when a magazine is lent or returned, the content of the social matrices will be updated when both core locks are held.

Table 1 below illustrates the content fields in the social matrix in the core i.

TABLE 1

| | | Core i | | | |
|---|---|---|---|---|---|
| | Timestamp | FMQ | EMQ | FMBQ | EMBQ |
| Core i | 100707 | 307 | 3 | 0 | 0 |
| Core j | 100317 | 507 | 0 | 101 | 0 |
| Core k | 100319 | 0 | 319 | 0 | 27 |
| Core m | 100507 | 199 | 100 | 0 | 0 |

As shown in Table 1, if the core i intends to borrow an empty magazine, it will first try to use the core k because it has the maximum size of EMBQ. If the borrowing fails, the program will continue to try a core with the maximum size of EMBQ shown in the social matrix (which has been updated from previous attempts) until the sizes of EMBQs of all the cores are zero. The program will then try a core with the maximum size of EMQ. Similarly, if the core i intends to borrow a full magazine, it will first try to borrow the full magazine from the core j because the core j has the maximum size of FMBQ.

A schematic diagram of a memory bullet shooting process for a core according to some embodiments of the present disclosure will be described below with reference to FIG. 5.

Figures 5, 6:
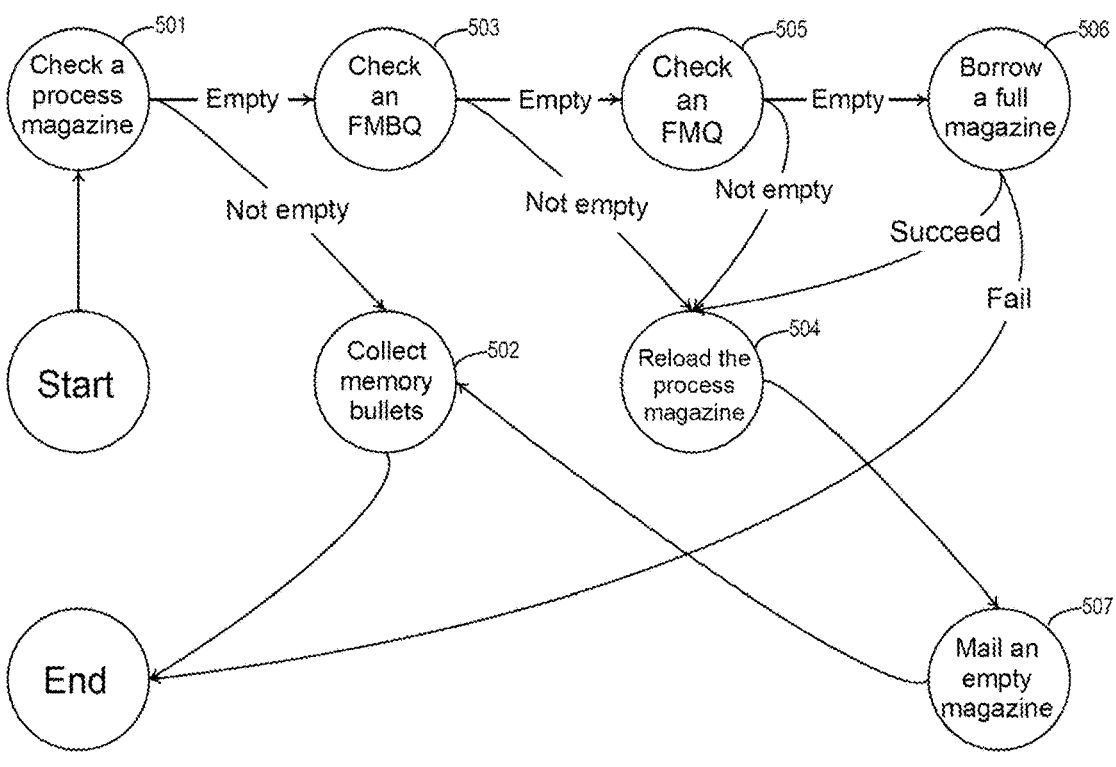
FIG. 5 illustrates a schematic diagram of a memory bullet shooting process for a core according to some embodiments of the present disclosure.
FIG. 6 illustrates a schematic diagram of a full magazine borrowing process for a core according to some embodiments of the present disclosure.

As shown in FIG. 5, in operation 501, it is checked whether a process magazine is empty. If the process magazine of the core is not empty (i.e., the process magazine has a number of memory bullets available for shooting, e.g., the number of memory bullets in the process magazine is not zero), then it may be preferable to shoot the memory bullets in the process magazine. That is, the process proceeds to operation 502 to perform the step of ejecting or popping out or shooting the memory bullets in the process magazine.

If the process magazine is empty, i.e., none of the addresses in the magazine are padded (there are no address pointers pointing to the memory bullets), and therefore it is failed to indicate the memory bullets that can be shot, then the process proceeds to operation 503 to check whether the number of full magazines in the FMBQ in the core is zero. If the number of full magazines in the FMBQ is not zero, i.e., there are address pointers specific to the memory bullets to be shot, in a full magazines borrowed from another core, in that core, then the process proceeds to operation 504, in which the process magazine is reloaded with a full magazine in the FMBQ to perform a memory bullet shooting task.

If the full magazines in the FMBQ are empty (i.e., the number of full magazines in the queue is zero), then no address pointers exist in the FMBQ for the memory bullets available for shooting, and therefore the process proceeds to operation 505 to check the number of full magazines in the FMQ owned by that core itself; and if the full magazines in the FMQ are not empty (i.e., the number is not zero), then the process proceeds to operation 504, in which the process magazine is reloaded with a full magazine in the FMQ to perform a memory bullet shooting task.

If the full magazines in the FMQ are empty (i.e., the number is zero), the process proceeds to operation 506 to borrow a full magazine from another core. If the borrowing succeeds, the process proceeds to operation 504, which is to reload the process magazine with the full magazine borrowed from another core to perform a memory bullet shooting task. If the borrowing fails, the program stops.

In addition, it should also be noted that when checking the full magazines in the FMBQ, the MGZs in this queue should be empty at the time of borrowing and need to be returned as soon as possible. Therefore, the program will run it first when it is available. Once the memory bullets indicated by the address pointers in the MGZ (which may be a process magazine, a full magazine in the FMBQ, a full magazine in the FMQ, or a full magazine borrowed from another core) that performs a memory bullet collecting task are all shot out, the MGZ becomes empty and is returned to its owner in a "mailed empty MGZ" state in operation 507.

A full magazine borrowing process for a core according to some embodiments of the present disclosure will be described below with reference to FIG. 6. This process conforms to the rule of "keeping a system balance to the utmost extent." Because the MGZ in the FMBQ was originally empty when borrowed, and a target core doesn't seem to have the capacity to use it up (therefore retained in the FMBQ) to a returned state. Now, the current core has the capacity to consume the memory bullets. Therefore, the best borrowing option is the MGZ within the FMBQ of the target core, which is a win-win option.

As shown in FIG. 6, in operation 601, the core will first determine a target core, e.g., by searching for a core with the maximum size of FMBQ in the social matrix to use as the target core. In operation 602, whether the target core has a larger core ID is determined, for example, if a current core needing to borrow the full magazine is a core j and the target core is a core k, then the target core has a larger core ID, and if the target core is the core i, then the target core has a smaller core ID.

If the target core has a smaller core ID, the lock of the current core is abandoned and tagged in operation 603. If the target core has a larger core ID, the lock of the target core is directly obtained and a determination is made as to whether abandoning the current lock operation is tagged (i.e., a determination is made as to whether the lock of the current core is abandoned) in operation 604. If the target core has a smaller core ID, it is also necessary to obtain the lock of the target core and determine whether the operation to abandon the current lock is tagged in operation 604.

If the abandoning operation is tagged, the process proceeds to operation 605, in which the current core lock is obtained; and if the abandoning operation is not tagged (i.e., the lock abandoning operation of the current core is not performed), the process proceeds to operation 606 to merge the social matrices of the target core and the current core. That is, once spin locks of the current and target locks are held in execution, an operation of combining or merging the social matrices, i.e., an operation of updating the contents of the social matrices in the current core and the target core is performed, which will be described in more detail later. Merging or combining social matrices is a communication way to increase the borrow hit rate and reduce cross-core browsing.

Then, in operation 607, an FMQ in the current magazine is checked, for example, whether the number of full magazines in the FMQ in the current magazine meets the requirements (i.e., whether there are full magazines) is checked. As mentioned above, to prevent deadlocks, attempts are made to hold each core spinlock in an ascending order of core IDs during borrowing. Therefore, in some cases, the lock of the current core may be removed for a period of time (e.g., in the operation 604). During this time period, other cores may access the current core and change its resources, e.g., other cores return some of full magazines of the current core. Therefore, before the current core does the real borrowing, we need to check the FMQ of the current core to check whether the number of empty magazines in the FMQ of the current core meets the requirement.

The number of full magazines in the FMQ is previously checked to be zero (e.g., in the operation 505), but now the number of full magazines in the FMQ may be not zero as being checked. This is because during the period of abandoning the lock of the current core, other cores (cores other than the target core) return some of the full magazines of the current core, and therefore the number of full magazines meets the requirement (i.e., the number is not zero) again. Then, a dequeuing operation is performed on the target magazine in operation 608.

If it is determined that the number of full magazines in the FMQ in the current magazine does not satisfy the requirement (i.e., the number remains zero), then whether the number of full magazines in an FMBQ of the target core meets the requirement (i.e., the number is not zero) is checked in operation 609. If the number of full magazines in the FMBQ of the target core meets the requirement, then the dequeuing operation is performed on the target magazine in the operation 608.

If the number of full magazines in the FMBQ of the target core does not meet the requirement, the lock of the target core is abandoned in operation 610 so as to find a new target core again. In other words, if no full MGZ is successfully borrowed in this round, the program will initiate a new round of operations starting from the operation 601 so as to find out a suitable target core through the social matrices. It should be noted that the social matrices have been combined in the previous round. Therefore, a new target core (different from that in the previous round) should be selected for this round.

Figures 7, 8:
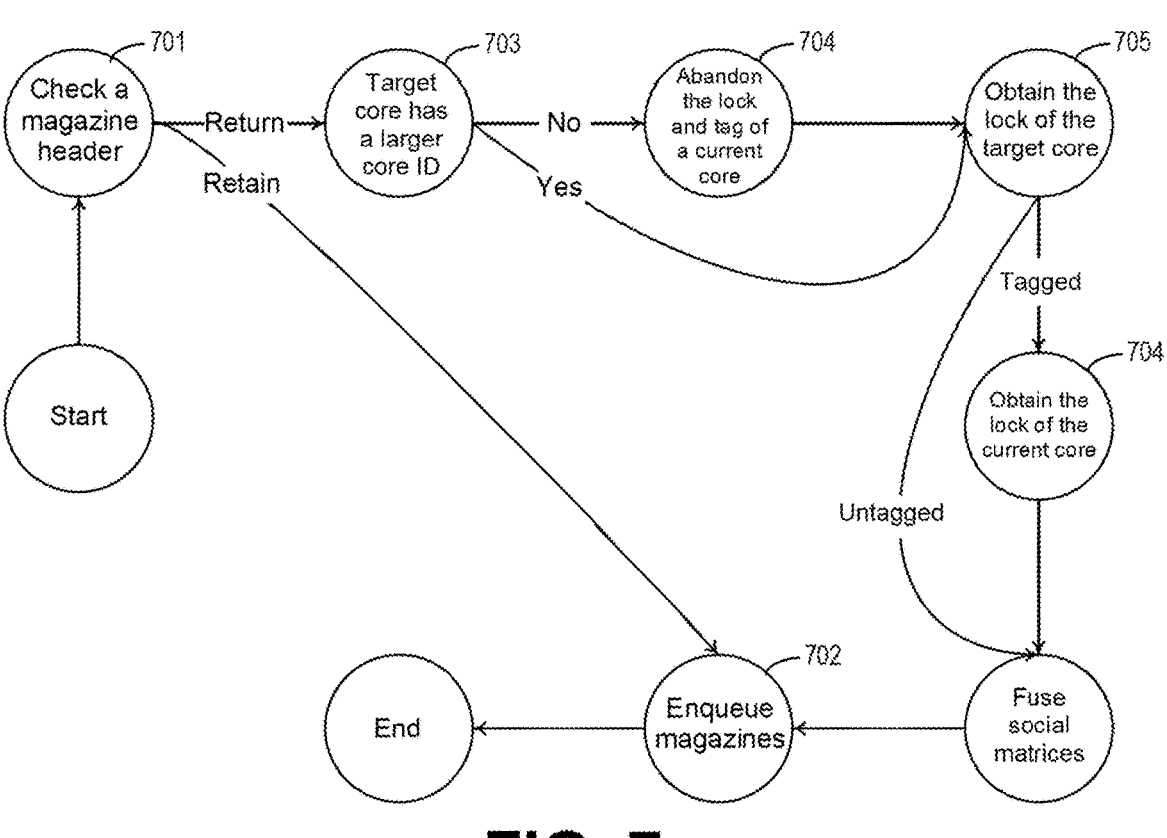
FIG. 7 illustrates a schematic diagram of an empty magazine mailing process for a core according to some embodiments of the present disclosure.
FIG. 8 illustrates a schematic diagram of a social matrix merging process according to some embodiments of the present disclosure.

An empty magazine mailing process for a core according to some embodiments of the present disclosure will be described below with reference to FIG. 7. Mailing of an empty magazine should follow certain rules, the focus here being on checking an MGZ header and determining whether this empty MGZ should be returned or retained. The rules can be as follows, for an empty magazine that needs to be returned, the "coreOwner" of the empty magazine does not match the ID of the current core, and the "borrowingState" of the current empty magazine is empty, i.e., the MGZ was empty when lent to another core and should be empty when returned. For an empty magazine that needs to be retained, none of the above conditions match, e.g., the "coreOwner" of the empty magazine matches the ID of the current core (i.e., the current core owns the empty magazine), or for example, if the "borrowingState" of the current empty magazine is NONE (which means that this MGZ is in service within the core to which it belongs) or B_FULL (which means that this MGZ was full when lent to another core and should be full when returned).

First, in operation 701, the core checks a magazine header, and if the magazine header indicates that the rules for retention are satisfied, the empty magazine is retained in the current core, i.e., in operation 702, the empty magazine is enqueued in the current core. If the magazine header indicates that the empty magazine to be mailed meets the rules for returning, then in operation 703, a determination is made as to whether the information of the core to which it belongs (coreOwner) in the magazine header indicates that the target core has a larger core ID, e.g., the current core is j, and if the target core is core k, then the target core has a larger core ID, and if the target core is the core i, then the target core has a smaller core ID.

If it is determined that the target core has a smaller core ID, the lock of the current core is abandoned and tagged in operation 704. Otherwise, if it is determined that the target core has a larger core ID, in operation 705, the lock of the target core is directly obtained, and a determination is made as to whether the lock abandoning operation is tagged. If it is determined that the target core has a smaller core ID, it is also necessary, in operation 705, to obtain the lock of the target core and determine whether the current lock abandoning operation is tagged (i.e., determine whether the lock of the current core is abandoned). If it is determined that the operation of abandoning the current lock is tagged, the process proceeds to operation 706 to obtain the lock of the current core.

If it is determined that the lock of the target core is not tagged (i.e., the lock abandoning operation of the current core is not performed), the process proceeds to operation 707 to merge social matrices of the target core and the current core. That is, once spin locks of the current and target locks are held in execution, an operation of combining or merging the social matrices, i.e., an operation of updating the contents of the social matrices in the current core and the target core, is performed. Merging or combining social matrices is a communication way to increase the borrow hit rate and reduce cross-core browsing. Then, in the operation 702, the empty magazine is enqueued into the target core.

A social matrix merging process according to some embodiments of the present disclosure will be described below with reference to FIG. 8.

It is assumed that two social matrices from core i and core k need to be combined together to generate two new duplicate matrices. The rule for combining is as follows: comparing elements of a timestamp column and retaining the relevant latest row. For example, the core i has the latest information about its own individual queues, the information about the core i has a timestamp of 100707 as shown in FIG. 8, which is the latest timestamp. The core k has the latest information about its own individual queues, for example, the information about the core k of FIG. 8 has a timestamp of 100707, which is the latest timestamp.

However, the information about the core k in the core i has a timestamp of 100319, which is less than 100707, and thus after merging the core i and the core k, the information about the core k in the core i is updated to the information in the core k with a timestamp of 100707. In addition, the information about the core i in the core k has a timestamp of 100315, which is less than 100707, and thus after merging the core i and the core k, the information about the core i in the core k is updated to the information in the core i with a timestamp of 100707.

It should be understood that each social matrix should have a 100% accurate latest row (just like the first row marked in gray in the core i and the third row marked in gray in the core k) that represents the management information of the current core. Therefore, when the social matrices of two cores are combined, these two latest rows should be updated and retained. For the other rows (e.g., information specific to the core j and core m), they are essentially generated from other combination.

Figure 9:
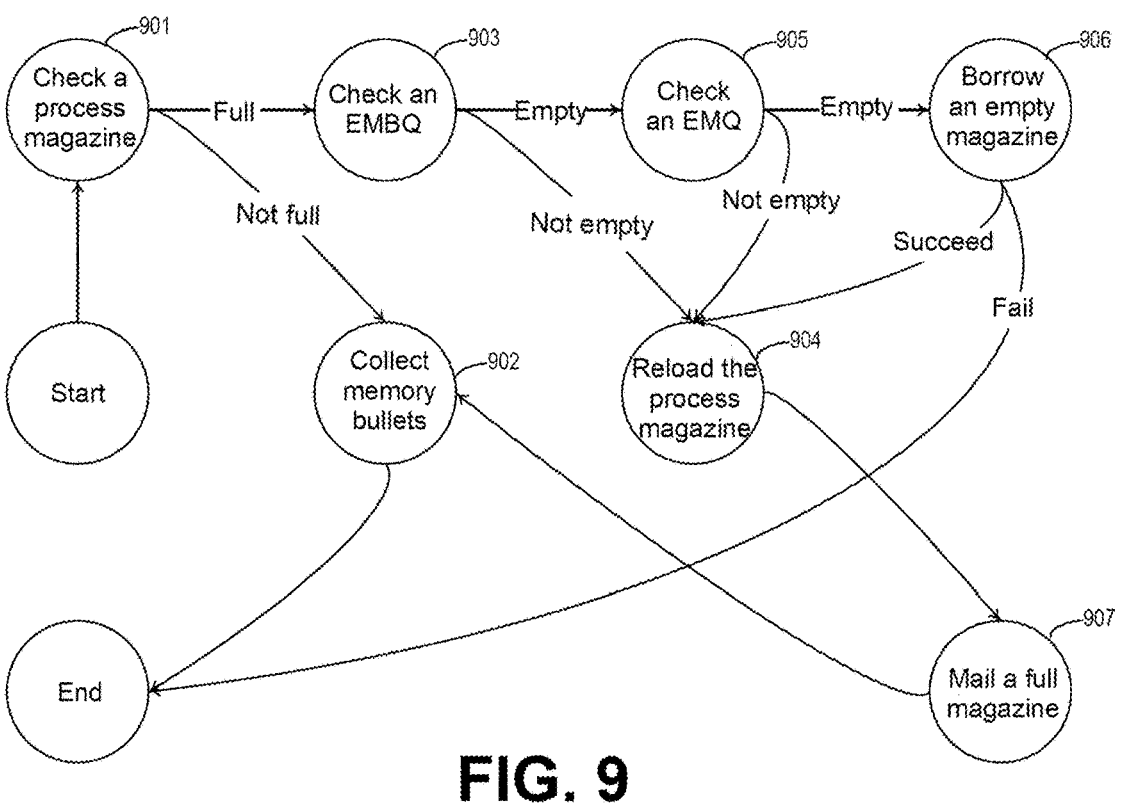
FIG. 9 illustrates a schematic diagram of a memory bullet collecting process for a current core according to some embodiments of the present disclosure.

A memory bullet collecting process for a current core according to some embodiments of the present disclosure will be described below with reference to FIG. 9. As shown in FIG. 9, in the presence of memory bullets to be collected, in operation 901, a process magazine (PMGZ) is first checked, and if a process magazine of the core is not full (which means that some addresses can be filled with address pointers specific to the memory bullets to be collected), e.g., if the amount of remaining space in the process magazine is greater than 0, it may be preferred to collect or push the memory bullets in the remaining space, i.e., the process proceeds to operation 902 to perform a memory bullet collecting task by using the process magazine.

If the process magazine is full (i.e., no address space exists for the collected memory bullets), then it is necessary to check, in operation 903, whether the number of empty magazines in the borrowed empty magazine queue (EMBQ) in that core is zero. If there is at least one empty magazine in the EMBQ (i.e., the number of empty magazines is not zero), then the process proceeds to operation 904, in which the process magazine is reloaded with the empty magazine in the EMBQ to perform a memory bullet collecting task.

If the empty magazines in the EMBQ are empty (i.e., the number of empty magazines in this queue is zero), i.e., there is no address pointer in the EMBQ for the memory bullets to be collected, and accordingly the process proceeds to operation 905 to check the empty magazines in the empty magazine queue (EMQ) owned by the core itself. If the empty magazines in the EMQ are not empty (i.e., the number is not zero), the process proceeds to the operation 904, in which the process magazine is reloaded with an empty magazine in the EMQ to perform a memory bullet collecting task.

If the empty magazines in the EMQ are empty (i.e., the number is zero), the process proceeds to operation 906 to borrow an empty magazine from another core. If the borrowing succeeds, the process proceed to the operation 904, in which the process magazine is reloaded with an empty magazine borrowed from another core to perform a memory bullet collecting task. If the borrowing fails, the program stops.

In addition, it should also be noted that when checking the empty magazines in the EMBQ, the MGZs in this queue should be full at the time of borrowing and need to be returned as soon as possible. Therefore, the program will run it first when it is available. Once address pointers of an MGZ (which may be a process magazine, an empty magazine in the EMBQ, an empty magazine in the EMQ, or an empty magazine borrowed from another core) that performs a memory bullet collecting task can be filled, the MGZ becomes full and will be returned to its owner in a "mailed full MGZ" state in operation 907.

An empty magazine borrowing process for a core according to some embodiments of the present disclosure will be described below with reference to FIG. 10. This process conforms to the rule of "keeping a system balance to the utmost extent." Because the MGZ in the EMBQ was originally full when borrowed, and a target core doesn't seem to have the capacity to fill it (retained in the EMBQ) to a returned state. Now, the current core has got the capacity to fill the memory bullets in that magazine. Therefore, the best borrowing option is the MGZ within the EMBQ of the target core, which is a win-win option.

Figure 10:
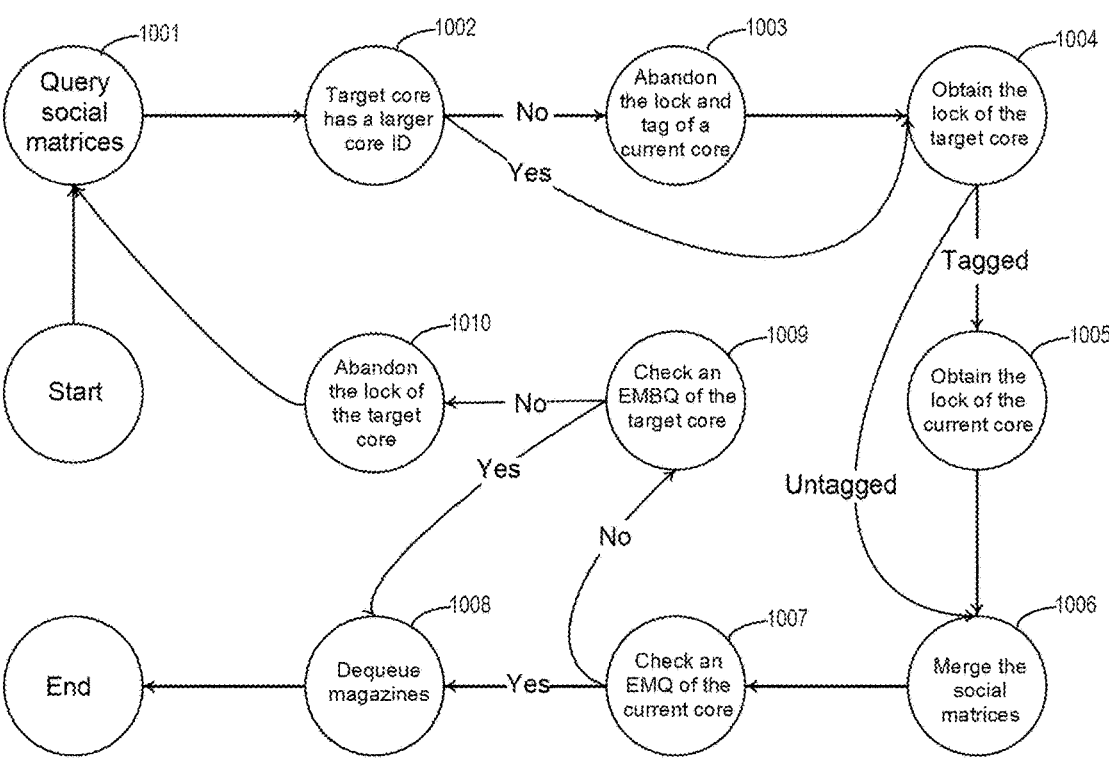
FIG. 10 illustrates a schematic diagram of an empty magazine borrowing process for a core according to some embodiments of the present disclosure.

As shown in FIG. 10, in operation 1001, a core will first determine a target core, e.g., by searching for a core with the maximum size of EMBQ in a social matrix to use as the target core. In operation 1002, whether the target core has a larger core ID is determined, for example, if a current core needing to borrow the empty magazine is the core j and the target core is the core k, then the target core has a larger core ID, and if the target core is the core i, then the target core has a smaller core ID.

If the target core has a smaller core ID, the lock of the current core is abandoned and tagged in operation 1004. If the target core has a larger core ID, the lock of the target core is directly obtained and a determination is made as to whether the lock of the target core is tagged in operation 1003, and then the lock of the target core is obtained and a determination is made as to whether the current lock abandoning operation is tagged in the operation 1003. If the target core has a smaller core ID, it is also necessary to obtain the lock of the target core and determine whether the operation of abandoning the current lock is tagged in the operation 1004.

If the abandoning operation is tagged, the process proceeds to operation 1005. In the operation 1005, the current core lock is obtained, and if the abandoning operation is not tagged (i.e., the lock abandoning operation of the current core is not performed), the process proceeds to operation 1006 to merge the social matrices of the target core and the current core. That is, once spin locks of the current and target locks are held in execution, an operation of combining or merging the social matrices, i.e., an operation of updating the contents of the social matrices in the current core and the target core, is performed.

Then, in operation 1007, an EMQ in the current magazine is checked, for example, whether the number of empty magazines in the EMQ in the current magazine meets the collecting requirements (i.e., whether there are empty magazines) is checked. As mentioned above, to prevent deadlocks, attempts are made to hold each core spinlock in an ascending order of core IDs during borrowing. Therefore, in some cases, the lock of the current core may be removed for a period of time (e.g., in the operation 1004). During this time period, other cores may access the current core and change its resources, e.g., other cores return some of empty magazines to the current core. Therefore, before the current core actually performs borrowing, we need to check the EMQ of the current core to check whether the number of empty magazines in the EMQ of the current core meet the requirement, e.g., whether there are empty magazines.

The number of empty magazines in the EMQ was previously checked to be zero (e.g., in the operation 905), but now the number of empty magazines in the EMQ may not be zero when being checked. This is because during the period of abandoning the lock of the current core, other cores (other cores outside of the target core) return some of the empty magazines of the current core, and therefore the number of empty magazines once again meets the collecting requirement (i.e., the number is not zero), then it is determined that the number of empty magazines in the EMQ in the current magazine meets the collecting requirement. Then, a dequeuing operation is performed on the target magazine in operation 1008.

If it is determined that the number of empty magazines in the EMQ in the current magazine does not meet the collecting requirement (i.e., the number remains zero), then whether the number of empty magazines in the EMBQ of the target core meets the collecting requirement (i.e., the number is not zero) is checked in operation 1009. If the number of empty magazines in the EMBQ of the target core meets the collecting requirement, then the dequeuing operation is performed on the target magazine in the operation 1008.

If the number of empty magazines in the EMBQ of the target core does not meet the requirement, the lock of the target core is abandoned in operation 1010 so as to find a new target core again. In other words, if no empty MGZ is successfully borrowed in this round, the program will initiate a new round of operations starting from the operation 1001 so as to find a suitable target core through the social matrices. It should be noted that the social matrices have been combined in the previous round. Therefore, a new target core (different from that in the previous round) should be selected for this round.

Figure 11:
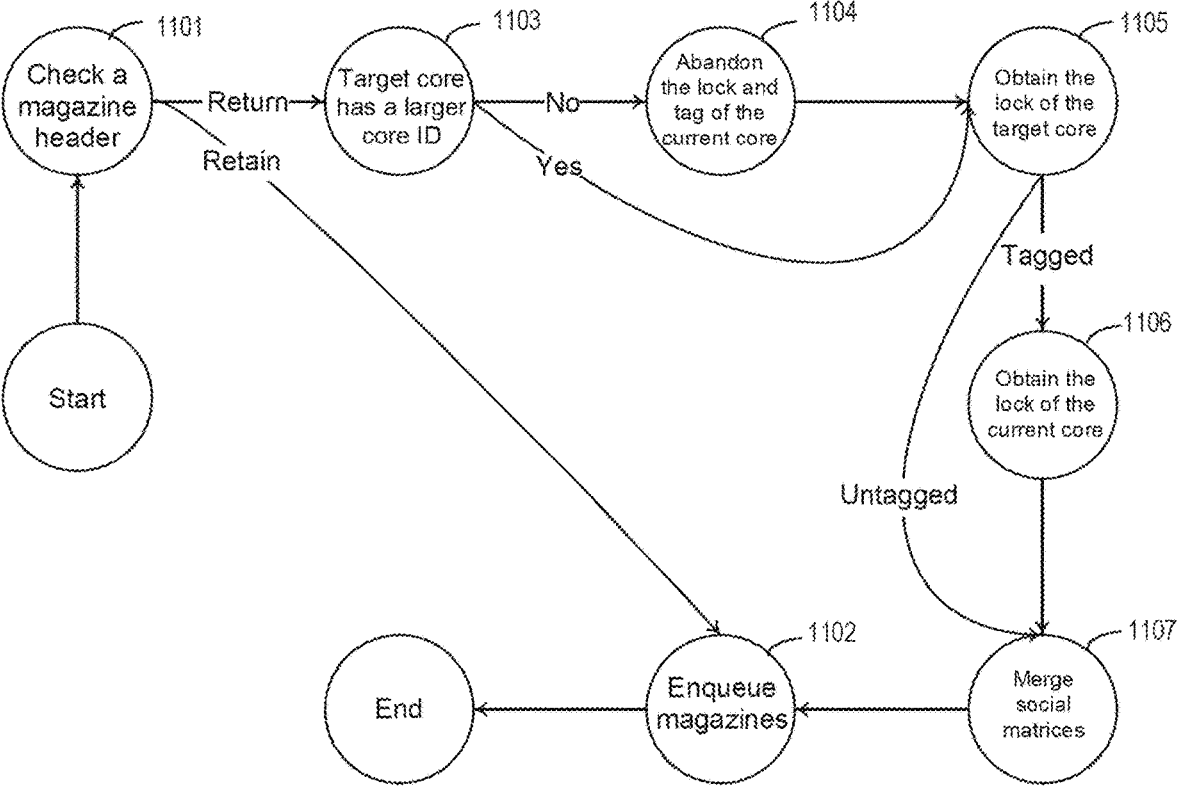
FIG. 11 illustrates a schematic diagram of a full magazine mailing process for a core according to some embodiments of the present disclosure.

A full magazine mailing process for a core according to some embodiments of the present disclosure will be described below with reference to FIG. 11. Mailing a full magazine should follow certain rules, the focus here being on checking an MGZ header and determining whether this full MGZ should be returned or retained. The rules may include the following: for a full magazine to be returned, the "coreOwner" of the full magazine does not match the ID of the current core; and the "borrowingState" of the current full magazine is full, i.e., the MGZ was full when it was lent to another core and should be full when it is returned. For a full magazine that needs to be retained, the rule is:

none of the above conditions match, e.g., the "coreOwner" of the full magazine matches the ID of the current core (i.e., the current core owns the full magazine), or for example, if the "borrowingState" of the current full magazine is NONE (which means that this MGZ is in service within the core to which it belongs) or B_EMPTY (which means that this MGZ was empty when lent to another core and should be empty when returned).

First, in operation 1101, the core checks the magazine header, and if the magazine header indicates that the rule for retention is satisfied, the full magazine is retained in the current core, i.e., in operation 1102, the full magazine is enqueued in the current core. If the magazine header indicates that a full magazine to be mailed satisfies the rule for returning, then in operation 1103, whether the information of a core to which it belongs (coreOwner) in the magazine header indicates that the target core has a larger core ID, e.g., the current core is j, and if the target core is core k, then the target core has a larger core ID, and if the target core is the core i, then the target core has a smaller core ID.

If it is determined that the target core has a smaller core ID, the lock of the current core is abandoned and tagged in operation 1104. Otherwise, if it is determined that the target core has a larger core ID, in operation 1105, the lock of the target core is directly obtained, and a determination is made as to whether the lock abandoning operation is tagged. If it is determined that the target core has a smaller core ID, it is also necessary, in operation 1105, to obtain the lock of the target core and determine whether the current lock abandoning operation is tagged (i.e., determine whether the lock of the current core is abandoned). If it is determined that the operation of abandoning the current lock is tagged, the process proceeds to operation 1106 to obtain the lock of the current core.

If it is determined that the lock of the current core is not tagged (i.e., the lock abandoning operation of the current core is not performed), the process proceeds to operation 1107 to merge social matrices of the target core and the current core. Once spin locks of the current and target locks are held in execution, an operation of combining or merging the social matrices, i.e., an operation of updating the contents of the social matrices in the current core and the target core is performed. Then, in the operation 1102, the full magazine is enqueued into the target core.

In some embodiments according to the present disclosure, provided is a method for collecting or shooting memory bullets in a first core including multiple magazines. Each magazine (MGZ) includes at least one address for at least one memory bullet. FIG. 12 illustrates a flowchart of a method 1200 for collecting or shooting memory bullets in a first core including multiple magazines according to some embodiments of the present disclosure.

In block 1210, memory bullets to be collected or to be shot are obtained. For the memory bullets to be collected or to be shot, a collecting or shooting operation may be performed one by one. In block 1220, whether remaining address pointers in multiple magazines of the first core have a capacity to collect or shoot a memory bullet is determined. In block 1230, in response to determining that the remaining address pointers in the first core have no capacity to collect or shoot a memory bullet, a magazine as needed is borrowed from a second core.

In some embodiments, the multiple magazines include: a process magazine (e.g., PMGZ) configured to be performing memory bullet shooting and collecting operations; a first-type magazine queue (e.g., FMBQ or EMBQ) containing at least one first-type magazine borrowed from another core; a second-type magazine queue (e.g., FMQ or EMQ) containing at least one second-type magazine owned by the first core itself; and a social matrix module, configured to: store, for each of the multiple cores, a first-type number that refers to the number of the at least one first-type magazine in the first-type magazine queue, and a second-type number that refers to the number of the at least one second-type magazine in the second-type magazine queue.

In some embodiments, the first-type magazine queue includes: at least one first-type full magazine (e.g., a full magazine included in the FMBQ) borrowed from another core, wherein the first-type full magazine was an empty magazine when borrowed from another core, is filled to full in the first core, and is to be returned to the other core when it becomes an empty magazine again; at least one first-type empty magazine (e.g., an empty magazine included in the EMBQ) borrowed from another core, wherein the first-type empty magazine was a full magazine when borrowed from another core, is drained to empty in the first core, and is to be returned to the other core when it becomes a full magazine again; In some embodiments, the second-type magazine queue includes: at least one second-type full magazine owned by the first core itself (e.g., a full magazine included in the FMQ); or at least one second-type empty magazine owned by the first core itself (e.g., an empty magazine included in the EMQ). The first-type number in the social matrix module includes the number of the first-type full magazines and the number of the first-type empty magazines, and the second-type number in the social matrix module includes the number of the second-type full magazines and the number of second-type empty magazines.

In some embodiments, determining whether remaining address pointers in multiple magazines of the first core have a capacity to collect or shoot a memory bullet includes: determining whether a first expected remaining address pointer exists in the process magazine of the first core; in response to determining that the first expected remaining address pointer does not exist (e.g., the process magazine is empty during memory bullet shooting; or the process magazine is full during memory bullet collecting), determining whether a second expected remaining address pointer exists in the at least one first-type magazine in the first-type magazine queue; in response to determining that the second expected remaining address pointer does not exist (e.g., the number of full magazines in the FMBQ is zero during memory bullet shooting; or the number of empty magazines in the EMBQ is zero during memory bullet collecting), determining whether a third expected remaining address pointer exists in the at least one second-type magazine in the second-type magazine queue; and in response to determining that the third expected remaining address pointer does not exist (e.g., the number of full magazines in the FMQ is zero in the process of memory bullet shooting; or the number of empty magazines in the EMQ is zero during memory bullet collecting), determining that remaining address pointers in multiple magazines of the first core have no capacity to collect or shoot a memory bullet.

In some embodiments, in response to determining that the first expected remaining address pointer exists, determining that the remaining address pointers in the multiple magazines of the first core have a capacity to collect or shoot a memory bullet; in response to determining that the second expected remaining address pointer exists, determining that the remaining address pointers in the multiple magazines of the first core have a capacity to collect or shoot a memory bullet; or in response to determining that the third expected remaining address pointer exists, determining that the remaining address pointers in the multiple magazines of the first core have a capacity to collect or shoot a memory bullet.

In some embodiments, the method further includes: in response to determining that the remaining address pointers in the multiple magazines of the first core have a capacity to collect or shoot a memory bullet, performing a memory bullet shooting or collecting task by using the process magazine, the first-type magazine, or the second-type magazine; or in response to successfully borrowing the magazine as needed from the second core, performing a memory bullet shooting or collecting task by using the magazine borrowed from the second core.

In some embodiments, the method further includes: when performing the memory bullet shooting or collecting task, in response to a target magazine reaching a return condition, returning the target magazine reaching the return condition to a target core to which the target magazine belongs.

In some embodiments, borrowing a magazine as needed from a second core in response to determining that the remaining address pointers in the first core have no capacity to collect or shoot a memory bullet includes: querying about the first-type numbers specific to other cores in the social matrix module of the first core, determining a core having the largest first-type number as the second core from which to borrow the magazine as needed, so as to borrow the magazine as needed from the second core.

In some embodiments, the method further includes: merging a first social matrix module of the first core and a second social matrix module of the second core to update the first-type numbers and the second-type numbers in the first social matrix module and the second social matrix module that are specific to the first core and the second core, respectively; querying about the updated second-type number in the updated first social matrix module; and in response to determining that the updated second-type number in the updated first social matrix module is not zero, skipping borrowing a magazine as needed from the second core and utilizing the second-type magazine of the first core to perform a memory bullet collecting or shooting task.

In some embodiments, the method further includes: in response to the updated second-type number in the updated first social matrix module being zero, querying whether the updated first-type number in the updated second social matrix module is zero; in response to the updated first-type number not being zero, borrowing the magazine as needed from the second core; or in response to the updated first-type number being zero, determining a core having the largest first-type number as another target core based on the updated first social matrix module or the updated second social matrix module so as to borrow the magazine as needed from the other target core.

In some embodiments, returning the target magazine reaching the return condition to a target core to which it belongs includes: determining whether a first ID of the first core is consistent with a second ID of the target core; in response to determining that the first ID is consistent with the second ID, retaining the target magazine in the first core; in response to determining that the first ID is not consistent with the second ID, merging the first social matrix module of the first core and a third social matrix module of the target core to update the first-type numbers and the second-type numbers in the first social matrix module and the third social matrix module that are specific to the first core and the target core; enqueueing the target magazine to the target core, wherein the return condition includes the target magazine reaching a state when the target magazine was borrowed.

In some embodiments, the memory bullets include memory bullets to be shot, the remaining address pointers in the multiple magazines include padded addresses, and the borrowed magazine as needed includes a full magazine from the second core and borrowed from a core other than the second core; alternatively, the memory bullet includes memory bullets to be collected, the remaining address pointers in the multiple magazines include unpadded addresses, and the borrowed magazine as needed includes an empty magazine from the second core and borrowed from a core other than the second core.

Figure 13:
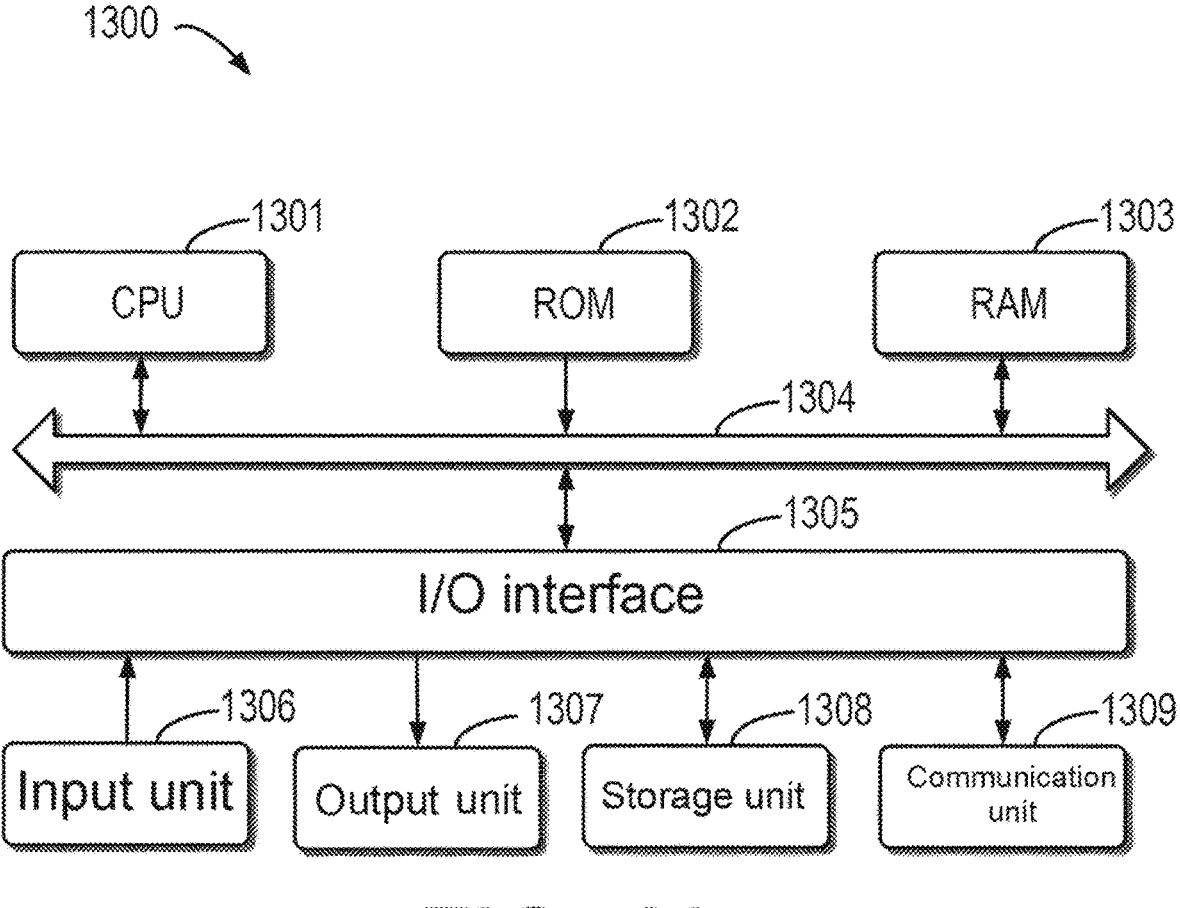
FIG. 13 illustrates a schematic block diagram of an example device that can be used to implement some embodiments of the present disclosure.

FIG. 13 illustrates a schematic block diagram of an example device 1300 that can be used to implement the embodiments of the present disclosure. The device 1300 can be used to implement the computing device 102 in FIG. 1. As shown in the figure, the device 1300 includes a central processing unit (CPU) 1301 that may perform various appropriate actions and processing according to computer program instructions stored in a read-only memory (ROM) 1302 or computer program instructions loaded from a storage unit 1308 into a random access memory (RAM) 1303. Various programs and data required for the operation of the device 1300 may also be stored in the RAM 1303. The CPU 1301, the ROM 1302, and the RAM 1303 are connected to each other through a bus 1304. An input/Output (I/O) interface 1305 is also connected to the bus 1304.

A plurality of components in the device 1300 are connected to the I/O interface 1305, including: an input unit 1306, such as a keyboard and a mouse; an output unit 1307, such as various types of displays and speakers; the storage unit 1308, such as a magnetic disk and an optical disc; and a communication unit 1309, such as a network card, a modem, and a wireless communication transceiver. The communication unit 1309 allows the device 1300 to exchange information/data with other devices via a computer network, such as the Internet, and/or various telecommunication networks.

The processing unit 1301 performs the various methods and processing described above, such as any one of processes 200, 400, 500, and 600. For example, in some embodiments, any one of the processes 200, 400, 500, and 600 may be implemented as a computer software program that is tangibly included in a machine-readable medium, for example, the storage unit 1308. In some embodiments, part or all of the computer program may be loaded and/or installed onto the device 1300 via the ROM 1302 and/or the communication unit 1309. When the computer program is loaded into the RAM 1303 and executed by the CPU 1301, one or more steps of any of the processes 200, 400, 500, and 600 described above can be executed. Alternatively, in other embodiments, the CPU 1301 may be configured in any other suitable manner (for example, by means of firmware) to perform any one of the processes 200, 400, 500, and 600.

The functions described herein above may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program codes for implementing the method of the present disclosure may be written by using one programming language or any combination of multiple programming languages. The program code may be provided to a processor or controller of a general purpose computer, a special purpose computer, or another programmable data processing apparatus, such that the program code, when executed by the processor or controller, implements the functions/operations specified in the working flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof.

Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for collecting or shooting memory bullets, comprising:
   obtaining memory bullets to be collected or shot, the memory bullets being to be collected to or shot out from a first core comprising multiple magazines, wherein each magazine comprises at least one address pointer specific to at least one memory bullet;
   determining whether remaining address pointers in the multiple magazines of the first core have a capacity to collect or shoot a memory bullet; and
   borrowing a magazine as needed from a second core in response to determining that the remaining address pointers in the first core have no capacity to collect or shoot a memory bullet.

2. The method according to claim 1, wherein the multiple magazines comprise:
   a process magazine, configured to be performing memory bullet shooting and collecting operations;
   a first-type magazine queue, containing at least one first-type magazine borrowed from another core;
   a second-type magazine queue, containing at least one second-type magazine owned by the first core; and
   a social matrix module, configured to: store, for each core, a first-type number that refers to the number of the at least one first-type magazine in the first-type magazine queue, and a second-type number that refers to the number of the at least one second-type magazine in the second-type magazine queue.

3. The method according to claim 2, wherein the first-type magazine queue comprises:
   at least one first-type full magazine borrowed from the other core, wherein the at least one first-type full magazine was an empty magazine when borrowed from the other core, is filled to full in the first core, and is to be returned to the other core when it becomes an empty magazine again; or
   at least one first-type empty magazine borrowed from the other core, wherein the at least one first-type empty magazine was a full magazine when borrowed from the other core, is drained to empty in the first core, and is to be returned to the other core when it becomes a full magazine again; and the second-type magazine queue comprises:

at least one second-type full magazine owned by the first core; or at least one second-type empty magazine owned by the first core, wherein the first-type number comprises the number of the at least one first-type full magazine and the number of the at least one first-type empty magazine; and the second-type number comprises the number of the at least one second-type full magazine and the number of the at least one second-type empty a magazine.

4. The method according to claim 2, wherein determining whether remaining address pointers in the multiple magazines of the first core have a capacity to collect or shoot the memory bullet comprises:

determining whether a first expected remaining address pointer exists in the process magazine of the first core;

in response to determining that the first expected remaining address pointer does not exist, determining whether a second expected remaining address pointer exists in the at least one first-type magazine in the first-type magazine queue;

in response to determining that the second expected remaining address pointer does not exist, determining whether a third expected remaining address pointer exists in the at least one second-type magazine in the second-type magazine queue; and in response to determining that the third expected remaining address pointer does not exist, determining that the remaining address pointers in the multiple magazines of the first core have no capacity to collect or shoot the memory bullet.

5. The method according to claim 4, wherein:

in response to determining that the first expected remaining address pointer exists, determining that the remaining address pointers in the multiple magazines of the first core have a capacity to collect or shoot the memory bullet;

in response to determining that the second expected remaining address pointer exists, determining that the remaining address pointers in the multiple magazines of the first core have a capacity to collect or shoot the memory bullet; or in response to determining that the third expected remaining address pointer exists, determining that the remaining address pointers in the multiple magazines of the first core have a capacity to collect or shoot the memory bullet.

6. The method according to claim 2, further comprising:

in response to determining that the remaining address pointers in the multiple magazines of the first core have a capacity to collect or shoot the memory bullet, performing a memory bullet shooting or collecting task by using the process magazine, the at least one first-type magazine, or the at least one second-type magazine; or in response to successfully borrowing the magazine as needed from the second core, performing a memory bullet shooting or collecting task by using the magazine borrowed from the second core.

7. The method according to claim 6, further comprising: when performing the memory bullet shooting or collecting task, in response to a target magazine reaching a return condition, returning the target magazine reaching the return condition to a target core to which the target magazine belongs.

8. The method according to claim 7, wherein returning the target magazine reaching the return condition to a target core to which the target magazine belongs comprises:

determining whether a first identifier (ID) of the first core is consistent with a second ID of the target core;

in response to determining that the first ID is consistent with the second ID, retaining the target magazine in the first core;

in response to determining that the first ID is not consistent with the second ID, merging the first social matrix module of the first core and a third social matrix module of the target core to update first-type numbers and second-type numbers in the first social matrix module and the third social matrix module that are specific to the first core and the target core; and enqueueing the target magazine to the target core, wherein the return condition comprises the target magazine reaching a state when the target magazine was borrowed.

9. The method according to claim 2, wherein borrowing a magazine as needed from a second core in response to determining that the remaining address pointers in the first core have no capacity to collect or shoot the memory bullet comprises:

querying about first-type numbers specific to other cores in the social matrix module of the first core, determining a core having the largest first-type number as the second core from which to borrow the magazine as needed, so as to borrow the magazine as needed from the second core.

10. The method according to claim 9, further comprising:

merging a first social matrix module of the first core and a second social matrix module of the second core to update first-type numbers and second-type numbers in the first social matrix module and the second social matrix module that are specific to the first core and the second core; and querying about the updated second-type number in the updated first social matrix module; and in response to determining that the updated second-type number in the updated first social matrix module is not zero, skipping borrowing a magazine as needed from the second core, and utilizing the at least one second-type magazine of the first core to perform a memory bullet collecting or shooting task.

11. The method according to claim 10, further comprising: in response to the updated second-type number in the updated first social matrix module being zero, querying whether the updated first-type number in the updated second social matrix module is zero;

in response to the updated first-type number not being zero, borrowing the magazine as needed from the second core; or in response to the updated first-type number being zero, determining a core having the largest first-type number as another target core based on the updated first social matrix module or the updated second social matrix module so as to borrow the magazine as needed from the other target core.

12. The method according to claim 1, wherein the memory bullets comprise memory bullets to be shot, the remaining address pointers in the multiple magazines comprise padded addresses, and the borrowed magazine as needed comprises a full magazine from the second core and borrowed from a core other than the second core; or the memory bullets comprise memory bullets to be collected, the remaining address pointers in the multiple magazines comprise unpadded addresses, and the borrowed magazine as needed comprises an empty magazine from the second core and borrowed from a core other than the second core.

13. An electronic device, comprising:

a processor; and a memory coupled to the processor, wherein the memory has instructions stored therein, and the instructions, when executed by the processor, cause the device to perform actions of collecting or shooting memory bullets, the actions comprising:

obtaining memory bullets to be collected or shot, the memory bullets being to be collected to or shot out from a first core comprising multiple magazines, wherein each magazine comprises at least one address pointer specific to at least one memory bullet;

determining whether remaining address pointers in the multiple magazines of the first core have a capacity to collect or shoot a memory bullet; and borrowing a magazine as needed from a second core in response to determining that the remaining address pointers in the first core have no capacity to collect or shoot a memory bullet.

14. The electronic device according to claim 13, wherein the multiple magazines comprise:

a process magazine, configured to be performing memory bullet shooting and collecting operations;

a first-type magazine queue, containing at least one first-type magazine borrowed from another core;

a second-type magazine queue, containing at least one second-type magazine owned by the first core; and a social matrix module, configured to: store, for each core, a first-type number that refers to the number of the at least one first-type magazine in the first-type magazine queue, and a second-type number that refers to the number of the at least one second-type magazine in the second-type magazine queue.

15. The electronic device according to claim 14, wherein the first-type magazine queue comprises:

at least one first-type full magazine borrowed from the other core, wherein the at least one first-type full magazine was an empty magazine when borrowed from the other core, is filled to full in the first core, and is to be returned to the other core when it becomes an empty magazine again; or at least one first-type empty magazine borrowed from the other core, wherein the at least one first-type empty magazine was a full magazine when borrowed from the other core, is drained to empty in the first core, and is to be returned to the other core when it becomes a full magazine again; and the second-type magazine queue comprises:

at least one second-type full magazine owned by the first core; or at least one second-type empty magazine owned by the first core, wherein the first-type number comprises the number of the at least one first-type full magazine and the number of the at least one first-type empty magazine;

the second-type number comprises the number of the at least one second-type full magazine and the number of the at least one second-type empty magazine.

16. The electronic device according to claim 14, wherein determining whether remaining address pointers in multiple magazines of the first core have a capacity to collect or shoot a memory bullet comprises:

determining whether a first expected remaining address pointer exists in the process magazine of the first core;

in response to determining that the first expected remaining address pointer does not exist, determining whether a second expected remaining address pointer exists in the at least one first-type magazine in the first-type magazine queue;

in response to determining that the second expected remaining address pointer does not exist, determining whether a third expected remaining address pointer exists in the at least one second-type magazine in the second-type magazine queue; and in response to determining that the third expected remaining address pointer does not exist, determining that the remaining address pointers in the multiple magazines of the first core have no capacity to collect or shoot a memory bullet.

17. The electronic device according to claim 14, further comprising:

in response to determining that the remaining address pointers in the multiple magazines of the first core have a capacity to collect or shoot a memory bullet, performing a memory bullet shooting or collecting task by using the process magazine, the at least one first-type magazine, or the at least one second-type magazine; or in response to successfully borrowing the magazine as needed from the second core, performing a memory bullet shooting or collecting task by using the magazine borrowed from the second core.

18. The electronic device according to claim 17, further comprising: when performing the memory bullet shooting or collecting task, in response to a target magazine reaching a return condition, returning the target magazine reaching the return condition to a target core to which the target magazine belongs.

19. The electronic device according to claim 14, wherein borrowing a magazine as needed from a second core in response to determining that the remaining address pointers in the first core have no capacity to collect or shoot a memory bullet comprises:

querying about the first-type numbers specific to other cores in the social matrix module of the first core, determining a core having the largest first-type number as the second core from which to borrow the magazine as needed, so as to borrow the magazine as needed from the second core.

20. A computer program product having a non-transitory computer readable medium which stores a set of instructions to collect or shoot memory bullets; the set of instructions, when carried out by computerized circuitry, causing the computerized circuitry to perform a method of:

obtaining memory bullets to be collected or shot, the memory bullets being to be collected to or shot out from a first core comprising multiple magazines, wherein each magazine comprises at least one address pointer specific to at least one memory bullet;

determining whether remaining address pointers in the multiple magazines of the first core have a capacity to collect or shoot a memory bullet; and borrowing a magazine as needed from a second core in response to determining that the remaining address pointers in the first core have no capacity to collect or shoot a memory bullet.

* * * * *